(12) United States Patent
Yin

(10) Patent No.: US 12,000,687 B2
(45) Date of Patent: Jun. 4, 2024

(54) DIGITAL TRACK RECORDING DEVICE AND COORDINATE CALIBRATION METHOD

(71) Applicants: QINGDAO LUOBO SMART EDUCATION TECHNOLOGIES CO., LTD, Qingdao (CN); QINGDAO LUOBO DIGITAL TECHNOLOGIES CO., LTD, Qingdao (CN)

(72) Inventor: Shujun Yin, Qingdao (CN)

( * ) Notice: Subject to any disclaimer, the term of this patent is extended or adjusted under 35 U.S.C. 154(b) by 0 days.

(21) Appl. No.: 17/610,953

(22) PCT Filed: Dec. 9, 2020

(86) PCT No.: PCT/CN2020/134779
§ 371 (c)(1),
(2) Date: Nov. 12, 2021

(87) PCT Pub. No.: WO2021/189947
PCT Pub. Date: Sep. 30, 2021

(65) Prior Publication Data
US 2023/0003505 A1 Jan. 5, 2023

(30) Foreign Application Priority Data
Mar. 24, 2020 (CN) ............... 20201021213.5

(51) Int. Cl.
*G01B 11/00* (2006.01)
*G06F 3/0354* (2013.01)
(Continued)

(52) U.S. Cl.
CPC ........ *G01B 11/002* (2013.01); *G06F 3/03545* (2013.01); *G06F 3/0418* (2013.01); *G06F 3/046* (2013.01)

(58) Field of Classification Search
CPC . G01B 11/002; G01B 21/042; G06F 3/03545; G06F 3/0418; G06F 3/046; G06F 3/038; G06F 3/0321
(Continued)

(56) References Cited

U.S. PATENT DOCUMENTS

| 2004/0081472 A1* | 4/2004 | Bardsley | H04B 10/69 398/202 |
| 2005/0280728 A1* | 12/2005 | Ishikawa | G06T 1/20 348/308 |
| 2020/0209991 A1* | 7/2020 | Wong | G06F 3/0346 |

* cited by examiner

Primary Examiner — Md M Rahman
(74) Attorney, Agent, or Firm — Ying-Ting Cheng; Law Office of Michael Chen

(57) ABSTRACT

A coordinate calibrating method includes the steps of: (1) reading paper coordinates by adopting two OID sensors, comparing the coordinates read by the two OID sensors with pre-designed coordinates of paper to obtain coordinate deviation of positions of the two OID sensors, and according to the coordinate deviation, calculating an inclination angle value θ generated by the coordinates of the two OID sensors; and (2) according to the coordinate deviation and the inclination angle value, calibrating an actually read coordinate position of a pen by selecting the second OID sensor as a reference point, translating horizontally and vertically coordinates of the pen to be corrected first, and then rotating the coordinates by the angle θ with reference to the second OID sensor, so that the positions of the two OID sensors coincide with pre-designed standard positions, and the coordinate position of the pen is calibrated.

5 Claims, 5 Drawing Sheets

(51) Int. Cl.
*G06F 3/041* (2006.01)
*G06F 3/046* (2006.01)

(58) Field of Classification Search
USPC .......................................................... 356/614
See application file for complete search history.

DIGITAL TRACK RECORDING DEVICE AND COORDINATE CALIBRATION METHOD

TECHNICAL FIELD

The present invention relates to the field of data processing, and more particularly, to a digital track recording device and a coordinate calibrating method.

BACKGROUND ART

Digital track recording has been widely used in the field of education, wherein a better application scenario is that students write with traditional paper and pen, writing tracks are collected at the same time, writing contents of the students are digitized, and then recorded and transmitted, and in combination with an AI technology and cloud processing, most heavy works such as correcting, recording and sorting which can only be implemented by manpower (mainly teachers) are efficiently completed by a machine.

A relatively common way is that a handwriting board of an electromagnetic induction technology is adopted, paper is laid on the board, an electromagnetic pen is provided with an ink core or a pencil core, and a user may digitize and process writing tracks while writing on the paper.

In some applications, it is necessary that a writing position on the paper corresponds strictly to a position on an electromagnetic induction antenna board. For example, when writing examination paper, writing tracks corresponding to different writing positions will be corrected differently.

The paper may be replaced, so that position deviation of the paper may occur during paper replacement. In actual products, a face shell of the handwriting board is often provided with a groove structure with a same size as the paper, which is convenient for filling the paper into a proper position. Moreover, a clamping mechanism is arranged, so that after being filled, the paper may remain fixed and may not move during writing.

However, there are still the following factors that may lead to the deviation between the paper and the electromagnetic induction antenna board: firstly, there is an error between the paper groove of the mechanism and the actual paper size; and secondly, deviation, such as dislocation and rotation of the paper occurs during manual operation. The deviation of the paper leads to a result that a position of data recorded by a track is deviated from an actual required position, which directly affects later data processing.

SUMMARY OF THE INVENTION

The present invention aims to provide a digital track recording device and a coordinate calibrating method, so as to solve the problems in the above background art.

In order to achieve the above objective, the present invention provides the following technical solutions.

A coordinate calibrating method includes the following steps of: (1) reading paper coordinates by adopting two OID sensors, comparing the coordinates read by the two OID sensors with pre-designed coordinates of paper to obtain coordinate deviation of positions of the two OID sensors, and according to the coordinate deviation, calculating an inclination angle value $\theta$ generated by the coordinates of the two OID sensors; and (2) according to the coordinate deviation and the inclination angle value, calibrating an actually read coordinate position of a pen by selecting the second OID sensor as a reference point, translating horizontally and vertically coordinates of the pen to be corrected first, and then rotating the coordinates by the angle $\theta$ with reference to the second OID sensor, so that the positions of the two OID sensors coincide with pre-designed standard positions, and the coordinate position of the pen is calibrated.

As a further solution of the present invention, sequences of the translating and the rotating during calibrating are capable of being exchanged, which means that the coordinates are rotated by the angle $\theta$ with reference to the second OID sensor first, and then points of the coordinates to be corrected are translated horizontally and vertically.

Further, the present invention also provides a digital track recording device adopting any method above, which includes the two OID sensors, a device body and a page number recognition area, wherein the two OID sensors are symmetrically arranged in a middle portion of a top end of the device body, and the page number recognition area is arranged at the top end of the device body and used for recognizing a page number of the paper.

As a further solution of the present invention, a face shell of the device body is provided with a groove structure with the same size as the paper.

As a further solution of the present invention, the digital track recording device is a handwriting board adopting an electromagnetic induction technology.

Compared with the prior art, the present invention has beneficial effects that: according to the present invention, deviation of the position on the paper from a corresponding electromagnetic induction antenna plate is capable of being corrected; and meanwhile, the digital track recording device is capable of inducting the page number on the paper, so as to distinguish different pieces of paper.

DETAILED DESCRIPTION OF THE PREFERRED EMBODIMENTS

Figure 1:
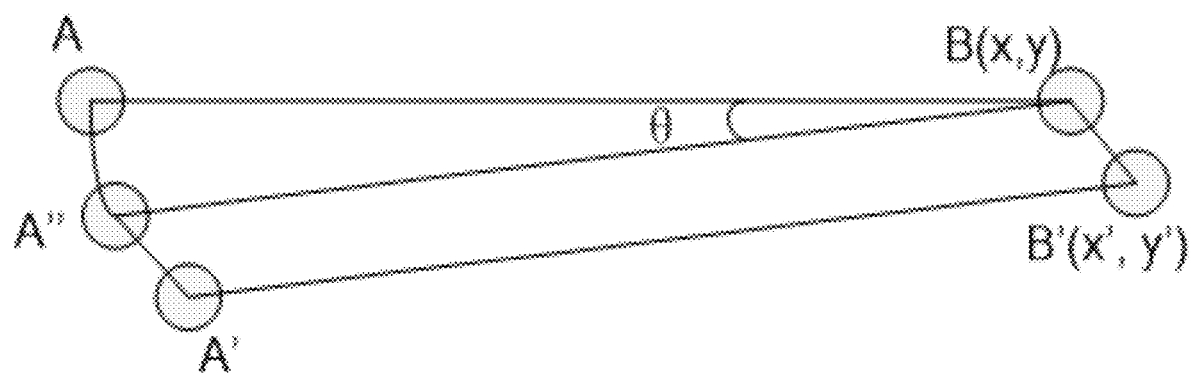
FIG. 1 is a schematic diagram of a calibration process of a method of the present invention.

In the drawings, 1 refers to two OID sensors, 2 refers to page number recognition area, 3 refers to device body, and 4 refers to paper.

DETAILED DESCRIPTION OF THE PREFERRED EMBODIMENTS

The technical solutions in the embodiments of the present invention are clearly and completely described with reference to the accompanying drawings in the embodiments of the present invention. Apparently, the described embodiments are only some but not all of the embodiments of the present invention. Based on the embodiments in the present invention, all other embodiments obtained by those of ordinary skills in the art without going through any creative work shall fall within the scope of protection of the present invention.

Figure 5:
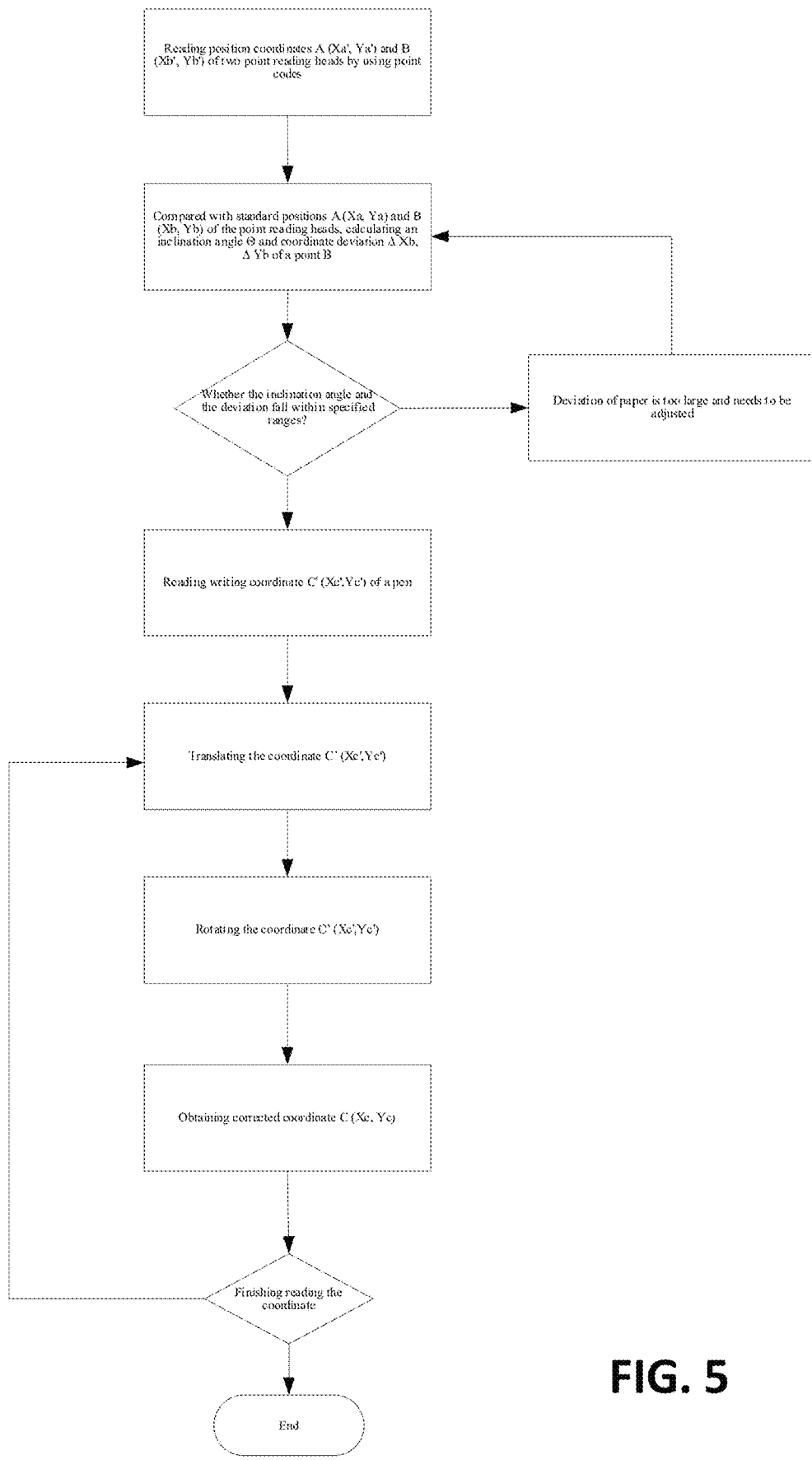
FIG. 5 is a flow chart of calibration in the method of the present invention.

With reference to FIG. 1 and FIG. 5, in the embodiment of the present invention, a coordinate calibrating method includes the following steps of: (1) reading paper coordinates by adopting two OID sensors, comparing the coordinates read by the two OID sensors with pre-designed coordinates of paper to obtain coordinate deviation of positions of the two OID sensors, and according to the coordinate deviation, calculating an inclination angle value θ generated by the coordinates of the two OID sensors; and (2) according to the coordinate deviation and the inclination angle value, calibrating an actually read coordinate position of a pen by selecting the second OID sensor as a reference point, translating horizontally and vertically coordinates of the pen to be corrected first, and then rotating the coordinates by the angle θ with reference to the second OID sensor, so that the positions of the two OID sensors coincide with pre-designed standard positions, and the coordinate position of the pen is calibrated.

As a further solution of the present invention, sequences of the translating and the rotating during calibrating are capable of being exchanged, which means that the coordinates are rotated by the angle θ with reference to the second OID sensor first, and then points of the coordinates to be corrected are translated horizontally and vertically.

It should be noted herein that the OID sensors are Optical Identification (OID) point reading sensors.

Figure 2:
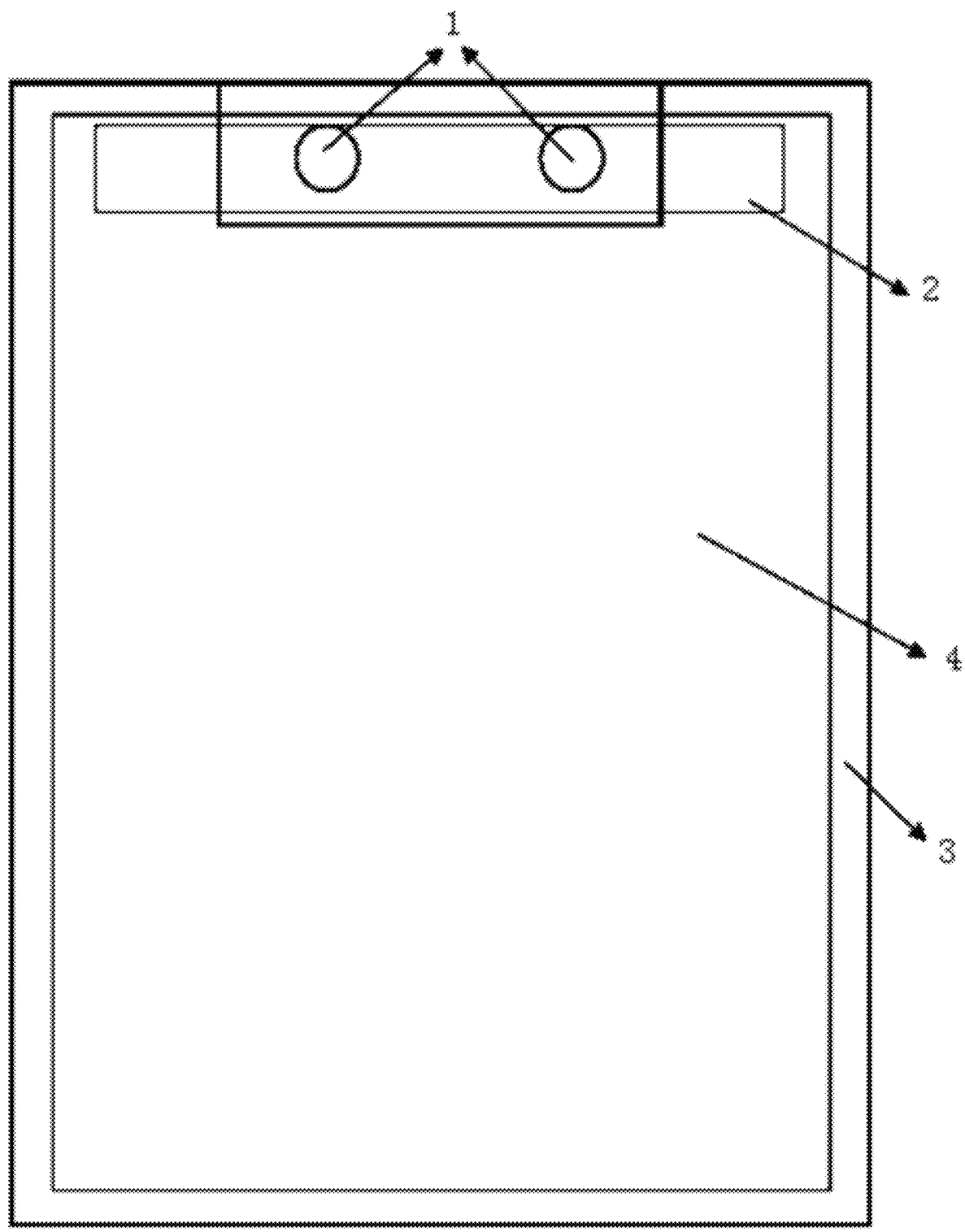
FIG. 2 is a schematic diagram of a digital track recording device of the present invention.

Further, the present invention also provides a digital track recording device adopting any method above, as shown in FIG. 2, which includes the two OID sensors 1, a device body 3 and a page number recognition area 2, wherein the two OID sensors 1 are symmetrically arranged in a middle portion of a top end of the device body 3, and the page number recognition area 2 is arranged at the top end of the device body 3 and used for recognizing a page number of the paper 4.

The embodiment of the present invention only discloses that the OID sensors are located in the middle portion of the top end. In fact, according to design requirements of the device, the two OID sensors may also be located in other edge areas, such as being located at a left end edge to be arranged up and down (the paper is inserted into a left groove from a right side), or being located at a lower end edge (the paper is inserted into a lower groove from top to bottom), or being located at a right end edge (the paper is inserted into a right groove from a left side).

The OID sensors are made by a characteristic that when a printing material is illuminated with infrared light, only a black carbon-containing pigment is reflected. An ordinary printing material is printed with a CMYK pigment. If the printing material is illuminated with the infrared light and all visible lights are blocked, it is found that only K layers of black contents are recognized by the sensors. Therefore, the OID sensors may pick up OID feature codes by printing K layers of carbon-containing pigment on test paper.

Figure 3:
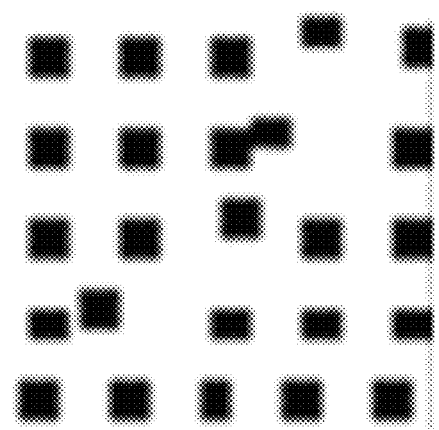
FIG. 3 is a schematic diagram of one OID code in the present invention.

FIG. 3 is an example of one OID feature code. The one OID feature code is a point code graph with a physical size of 0.5*0.5 inches formed by permutation and combination of irregular point codes. One OID point code contains position code value information of one OID in X and Y directions, and X and Y position code values of adjacent point codes are changed linearly.

A total number of OID feature codes used by us is 2^28=268435456, and a total page number is 130,000. Therefore, we divide the OID feature codes into 130,000 parts, thus forming the OID code recognition area of the page number. The OID feature code recognition area of the test paper of corresponding page number is pieced together with the test paper and then printed to form the test paper used by us.

A principle of implementing handwriting correction based on code reading information in the present invention is introduced hereinafter.

1. Horizontal and Vertical Deviation

Figure 4:
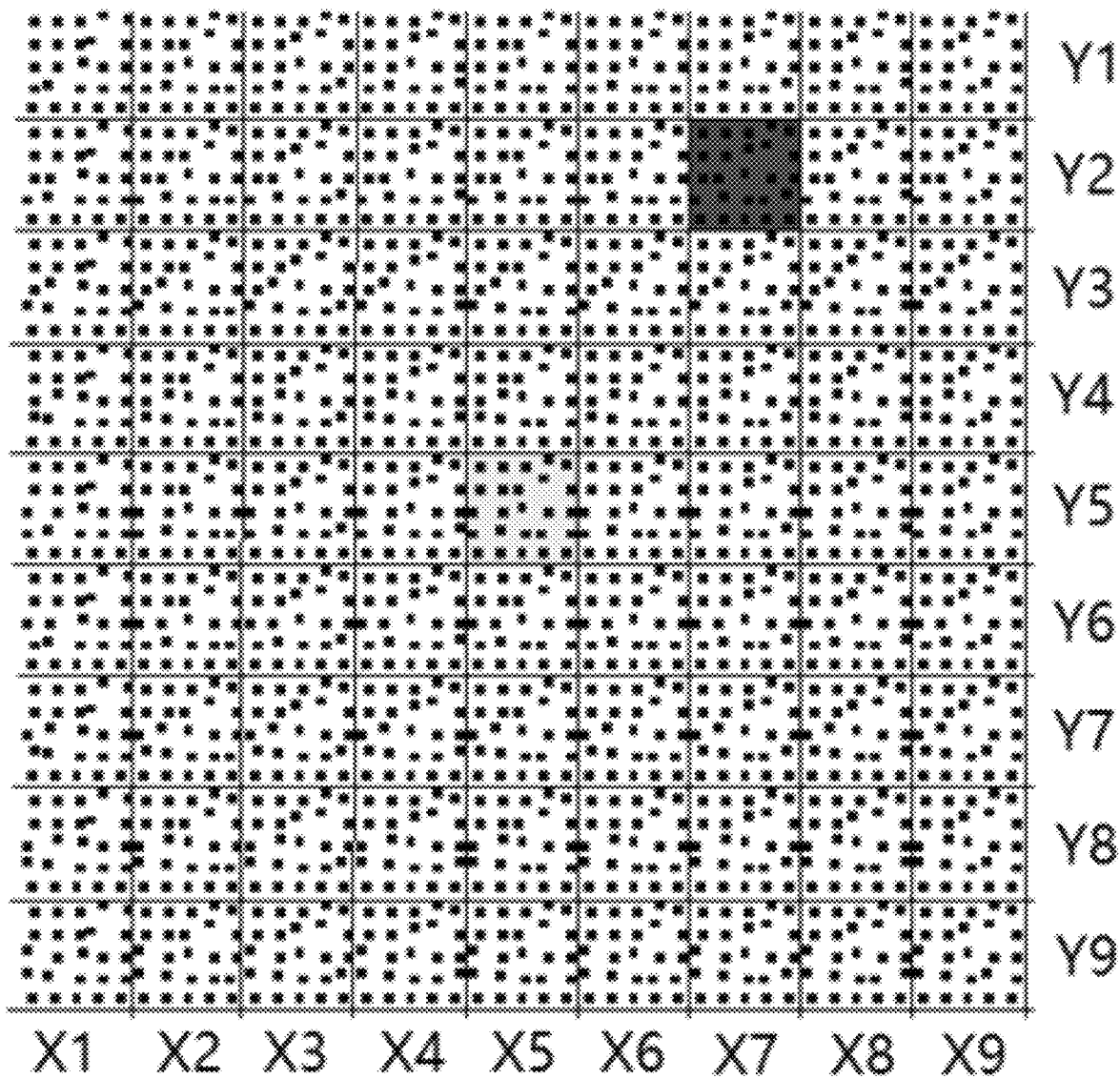
FIG. 4 is a schematic diagram of recognition of paper placed on the digital track recording device of the present invention.

The OID feature code as shown in FIG. 4 is printed in the page number recognition area of the test paper:

When the test paper is put on the device of the present invention, the OID sensors directly face the page number recognition area of the test paper, and the OID sensors just acquire a center of the page number recognition area, which is namely an area corresponding to coordinates (X5,Y5) in the above drawing. At the moment, a code value read out is X5Y5, and if a printed content of the page number recognition area deviates from an original position, a deviation distance of test paper printing may be obtained by calculating a deviation distance of the page number recognition area, thus using the deviation value to perform a correction operation. For example, when the printed content deviates from a correct position, the position where the OID sensors directly face is an area corresponding to coordinates (X7, Y2) in the above drawing. At the moment, a code read out is X7Y2, which indicates that the printed content of the test paper deviates to the left by two feature code units, which is namely 1.27×2=2.54 mm, and deviates downwardly by three feature code units, which is namely 1.27×3=3.81 mm. Therefore, correction parameters in horizontal and vertical directions are obtained.

Calculation of rotation deviation: according to x and y coordinates of two points formed by X and Y information of two OID sensors and a trigonometric function of a right triangle, a rotation angle between the test paper and an OID sensor module, which is namely a rotation angle between a placement position of the test paper and the device of the present invention, may be obtained.

After obtaining horizontal, vertical and rotational deviations of the test paper from the device of the present invention, a collected handwriting may have a same effect as test paper writing and upper computer displaying after deviation correction.

The present invention may refer to the following description in application:

1. in a first step, rotation is performed first based on a rotation point according to an angle reported by a camera first;
2. in a second step, X and Y values of a dot matrix reported by the camera are compared with standard X and Y values for up, down, left and right translation in a second step;

if the placement position of the test paper is tilted counterclockwise, it is necessary to rotate the test paper back clockwise;

angle reported by device: Angle;

π: PI;

coordinates of antenna board reported by device: X, Y;

deviation of coordinates reported by camera from standard coordinates: Δ oid_x, Δ oid_y;

corrected coordinates: adjust_x, adjust_y;

radian: R;

coordinates of antenna board corresponding to rotation point: o_x, o_y;

formula of clockwise rotation:

$$R = Angle * PI / 180.0;$$

$$adjust\_x = (X - o\_x) * \cos(R) - (Y - o\_y) * \sin(R) + o\_x;$$

$$adjust\_y = (Y - o\_y) * \cos(R) - (X - o\_x) * \sin(R) + o\_y;$$

if the placement position of the test paper is tilted clockwise, it is necessary to rotate the test paper back counterclockwise;

formula of counterclockwise rotation:

$$R = Angle * PI / 180.0;$$

$$adjust\_x = (Y - o\_y) * \sin(R) + (X - o\_x) * \cos(R) + o\_x;$$

$$adjust\_y = (Y - o\_y) * \cos(R) - (X - o\_x) * \sin(R) + o\_y.$$

As a further solution of the present invention, a face shell of the device body 3 is provided with a groove structure with the same size as the paper 4.

As a further solution of the present invention, the digital track recording device is a handwriting board adopting an electromagnetic induction technology.

It is apparent for those skilled in the art that the present invention is not limited to the details of the above exemplary embodiments, and the present invention can be realized in other specific forms without departing from the spirit or basic characteristics of the present invention. Therefore, the embodiments should be regarded as being exemplary and non-limiting from any point of view, and the scope of the present invention is defined by the appended claims rather than the above description, so that it is intended to comprise all changes falling within the meaning and range of equivalent elements of the claims. Any reference numerals in the claims should not be regarded as limiting the claims involved.

In addition, it should be understood that although the description is described according to the embodiments, each embodiment does not contain only one independent technical solution. The narration mode of the description is only for purpose of clarifying, and those skilled in the art should take the description as a whole. The technical solutions in each embodiment may also be combined appropriately to form other embodiments that may be understood by those skilled in the art.

What is claimed is:

1. A coordinate calibrating method, comprising the following steps of: (1) reading paper coordinates with two Optical Identification (OID) sensors, comparing the coordinates read by the two OID sensors with pre-designed coordinates of paper to obtain coordinate deviation of positions of the two OID sensors, and according to the coordinate deviation, calculating an inclination angle value θ generated by the coordinates of the two OID sensors; and (2) according to the coordinate deviation and the inclination angle value, calibrating an actually read coordinate position of a pen by selecting the second OID sensor as a reference point, translating horizontally and vertically coordinates of the pen to be corrected first, and then rotating the coordinates by the angle θ with reference to the second OID sensor, so that the positions of the two OID sensors coincide with pre-designed standard positions, and the coordinate position of the pen is calibrated.

2. The coordinate calibrating method according to claim 1, wherein sequences of the translating and the rotating during calibrating are capable of being exchanged, which means that the coordinates are rotated by the angle θ with reference to the second OID sensor first, and then points of the coordinates to be corrected are translated horizontally and vertically.

3. A digital track recording device with the method according to any one of claim 1, comprising the two OID sensors, a device body and a page number recognition area, wherein the two OID sensors are arranged at an edge area of the device body and used for reading coordinates of paper, and the page number recognition area is arranged at a top end of the device body and used for recognizing a page number of the paper.

4. The digital track recording device according to claim 3, wherein a face shell of the device body is provided with a groove structure with the same size as the paper.

5. The digital track recording device according to claim 3, wherein the digital track recording device is a handwriting board adopting an electromagnetic induction technology.

* * * * *